(12) United States Patent
Craig

(10) Patent No.: US 8,161,907 B2
(45) Date of Patent: Apr. 24, 2012

(54) LIVESTOCK WATERER

(75) Inventor: Cory Michael Craig, Scottsburg, IN (US)

(73) Assignee: Double C Ranch Supply LLC, Scottsburg, IN (US)

(*) Notice: Subject to any disclaimer, the term of this patent is extended or adjusted under 35 U.S.C. 154(b) by 103 days.

(21) Appl. No.: 12/049,610

(22) Filed: Mar. 17, 2008

(65) Prior Publication Data
US 2008/0230009 A1 Sep. 25, 2008

Related U.S. Application Data

(60) Provisional application No. 60/918,468, filed on Mar. 16, 2007.

(51) Int. Cl.
A01K 7/00 (2006.01)
(52) U.S. Cl. .......................................................... 119/77
(58) Field of Classification Search .................. 119/51.5, 119/63, 73, 74, 77; 222/129, 353, 457, 478–479; 137/453
See application file for complete search history.

(56) References Cited

U.S. PATENT DOCUMENTS

| | | | | |
|---|---|---|---|---|
| 1,881,838 A | * | 10/1932 | Mohr | 119/73 |
| 2,133,388 A | * | 10/1938 | Henderson | 119/73 |
| 2,162,314 A | * | 6/1939 | Thomas | 119/73 |
| 2,345,400 A | * | 3/1944 | Kelly et al. | 119/73 |
| 2,512,510 A | * | 6/1950 | Wartes | 119/73 |
| 2,665,366 A | * | 1/1954 | Cleveland | 392/444 |
| 2,671,430 A | * | 3/1954 | Miller | 119/73 |
| 2,674,227 A | * | 4/1954 | Saunders et al. | 119/73 |
| 4,007,371 A | * | 2/1977 | Njos et al. | 219/523 |
| 4,130,090 A | * | 12/1978 | Bohlmann | 119/73 |
| 4,397,266 A | * | 8/1983 | Noland et al. | 119/73 |
| 4,704,991 A | * | 11/1987 | Moore | 119/73 |
| 4,908,501 A | * | 3/1990 | Arnold, III | 219/438 |
| 5,156,113 A | * | 10/1992 | Sextro | 119/73 |
| 5,282,962 A | * | 2/1994 | Chen | 210/167.25 |
| 5,332,014 A | * | 7/1994 | Feig | 141/110 |
| 5,682,836 A | * | 11/1997 | Gustin | 119/73 |
| 5,711,248 A | * | 1/1998 | Boyd | 119/77 |
| 5,809,934 A | * | 9/1998 | Gavet | 119/52.1 |
| 6,390,022 B1 | * | 5/2002 | Eichler et al. | 119/72 |
| 6,722,313 B2 | * | 4/2004 | Wenstrand | 119/73 |
| 7,007,634 B1 | * | 3/2006 | Pederson | 119/78 |
| 7,735,455 B2 | * | 6/2010 | Clark, Jr. | 119/73 |

* cited by examiner

Primary Examiner — Rob Swiatek
Assistant Examiner — Ebony Evans
(74) Attorney, Agent, or Firm — Dinsmore & Shohl LLP

(57) ABSTRACT

A device and method designed to provide a continuous supply of liquid to livestock is presented. The one-piece device comprises a storage tank and a drinking bowl. The storage tank can have a filling access hole for filling the tank. The tank can have at least one drinking bowl access hole which allows access from the tank to the bowl. Both the filling access hole and the drinking bowl access holes can be opened and closed. While filling, the drinking bowl access hole can be closed. After filling, the filling access hole can be closed and the drinking bowl access hole can be opened allowing liquid to flow from the tank into the bowl. Gravity and air pressure within the tank maintain a constant liquid level in the bowl while simultaneously preventing liquid from overflowing the bowl. A heating element can be placed into the tank to prevent freezing.

22 Claims, 1 Drawing Sheet

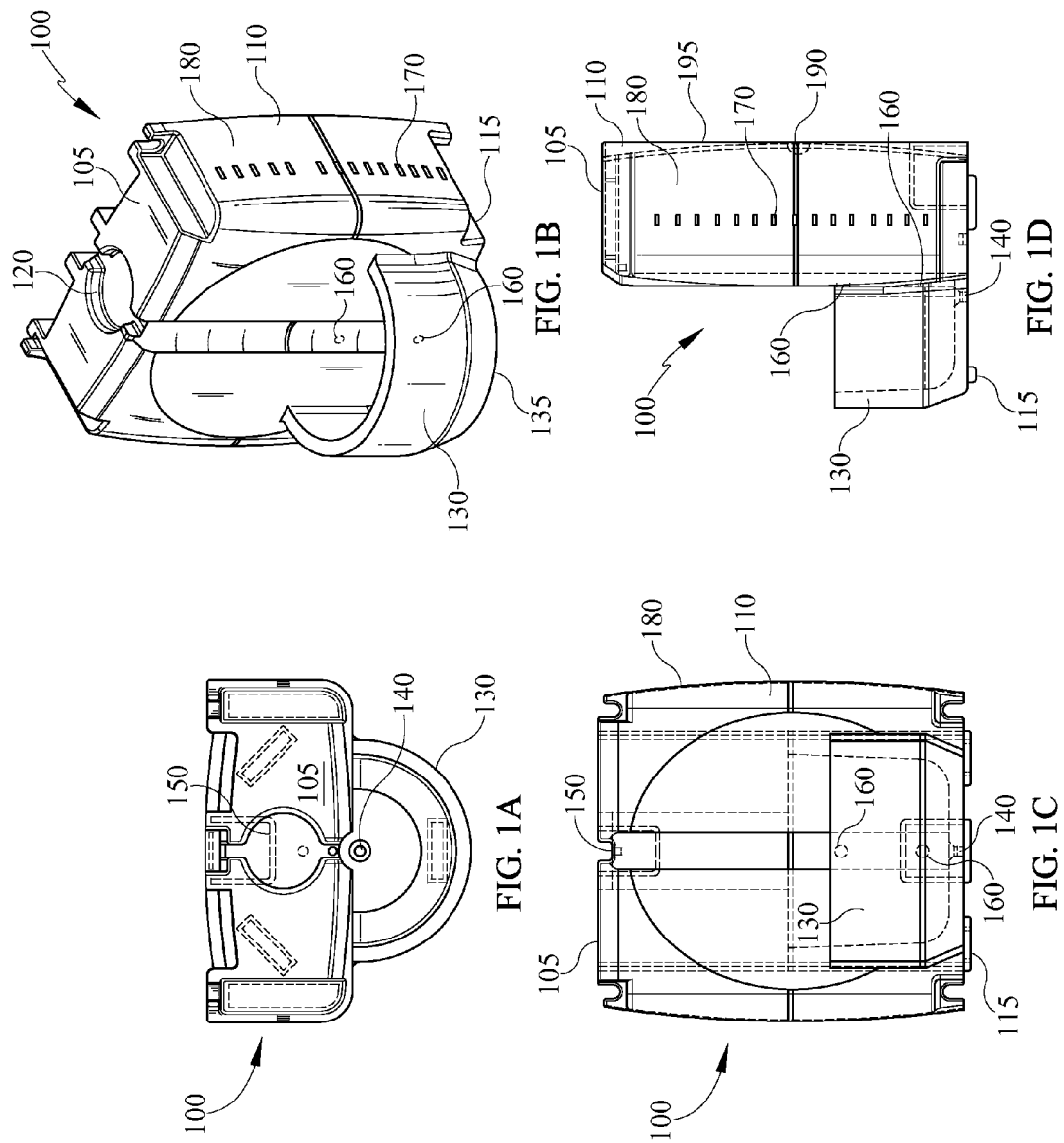

LIVESTOCK WATERER

CROSS-REFERENCE TO RELATED APPLICATIONS

This application claims the benefit of U.S. Provisional Application Ser. No. 60/918,468, filed Mar. 16, 2007.

BACKGROUND OF THE INVENTION

The present invention relates, generally, to a livestock waterer and, in particular, to a simple, cost-effective livestock waterer that can provide at least a day's supply of water to an animal.

Livestock waterers are commonly known in the art. However, typical waterers are geared towards large scale farms and ranches. These waterers tend to be complicated and require a dedicated water line and/or electrical lines which tends to be cost prohibitive to the small scale farmer, rancher and/or breeder. A typical small scale livestock owner uses a five gallon water bucket in each animal stall to provide water to the livestock. For example, a horse under average conditions typically consumes about fifteen gallons of water a day. Therefore, a water bucket for a typical horse on an average day must be filled at least two or three times which can be time consuming. Additionally, the buckets must be cleaned several times a week, due to being exposed to hay, feed, animal dandruff and excrement, and other potentially septic elements in the animal stall.

Additionally, there are some bird baths that utilize a water storage tank system that has a drinking bowl attached to the water storage tank. When the bird bath is inverted, the storage tank is filled with water and then turned upright. The water enters the drinking bowl through a hole in the water tank and fills the bowl to the level of the hole. However, due to the weight of the large volume of water necessary to water livestock, this scheme of inverting the storage tank is not suitable for large animals.

Therefore, there is a need for a simple, cost-effective, time-efficient, and sanitary large livestock waterer which does not require a dedicated water and/or electrical line to keep the waterer filled.

BRIEF SUMMARY OF THE INVENTION

According to the present invention, a device and method designed to provide a continuous supply of liquid to livestock is presented. The device comprises a storage tank and a drinking bowl located proximate to the lower portion of the storage tank. The storage tank can have a filling access hole into which an operator may fill the storage tank with liquid. The storage tank can have at least one drinking bowl access hole which allows access from the storage tank to the drinking bowl. Both the filling access hole and the drinking bowl access holes can be opened and closed. While filling the storage tank, the drinking bowl access hole can be closed. After filling, the filling access hole can be closed and the drinking bowl access hole can be opened allowing liquid to flow from the storage tank into the drinking bowl. Gravity and air pressure within the storage tank maintain a constant liquid level in the drinking bowl while simultaneously preventing the liquid from overflowing the drinking bowl.

In accordance with one embodiment of the present invention, a heating element can be incorporated with the storage tank in order to prevent the liquid in the waterer from freezing.

Accordingly, it is a feature of the embodiments of the present invention to provide simple, cost-effective, time-efficient, and sanitary large livestock waterer which maintains a constant liquid level in a drinking bowl and does not require a dedicated water and/or electrical line. Other features of the embodiments of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which:

FIGS. 1A-D illustrate a device designed to provide a continuous supply of liquid to livestock according to an embodiment of the present invention.

DETAILED DESCRIPTION

In the following detailed description of the embodiments, reference is made to the accompanying drawings that form a part hereof, and in which are shown by way of illustration, and not by way of limitation, specific embodiments in which the invention may be practiced. It is to be understood that other embodiments may be utilized and that logical, mechanical and electrical changes may be made without departing from the spirit and scope of the present invention.

Referring initially to FIG. 1, a device designed to provide a continuous supply of water to livestock is illustrated. The device can be a livestock waterer 100. The waterer 100 is designed to safely and predictably provide at least one day's supply of water to large livestock, such as, for example, cattle and horses. The waterer 100 can also be used with smaller animals, such as, for example, sheep, pigs, goats, dogs, cats or any other domesticated animal. In one embodiment, the waterer 100 can be a one-piece molded device. In another embodiment, the waterer 100 can be comprised of a storage tank 110 and a separate drinking bowl 130. In this embodiment, the drinking bowl 130 can be attached to the lower portion of the storage tank 110 by, for example, a screwing mechanism, epoxy, or any other suitable method of securely attaching the drinking bowl 130 to the storage tank 110. The waterer 100 can be comprised of plastic or any other suitable material. The waterer 100 can have a storage tank 110 for storing water. The storage tank 110 can have a capacity of about eighteen gallons, although other capacities are possible. The storage tank 110 can have fill lines 170 visible along the side 180 of the storage tank 110, demarking the amount of water in the storage tank 110. The fill lines 170 can be in gallon increments or any other suitable incremental demarcation. The fill lines 170 can allow the operator to quickly determine the amount of water remaining in the storage tank 110. The storage tank 110 can be filled manually with an ordinary water hose or bucket and does not require a dedicated water line. Filling the storage tank 110 manually can allow the operator to monitor the amount of water being consumed by the livestock by monitoring the water level in the storage tank 110 using the fill lines 170. The storage tank 110 can be filled through a filling access hole 150 that can be located within an air tight spin weld filling 120. The filling access hole 150 can be located on the top surface 105 of the storage tank 110, on the side 180, near the top 105, of the storage tank 110, or in any other suitable position located proximately to the top 105 of the storage tank 110.

A drinking bowl 130 can be located proximate to a lower portion 115 of the storage tank 110. The storage tank 110 and the drinking bowl 130 can form the one-piece waterer 100. The storage tank 110 can have at least one drinking bowl access hole 160 that can allow access from the storage tank 110 to the drinking bowl 130. In one embodiment, the storage tank 110 can have two drinking bowl access holes 160. The at least one drinking bowl access hole 160 can be located approximately half way between the top 105 and the bottom 115 of the waterer 100. In one embodiment, the at least one drinking bowl access hole can be located approximately three inches from the bottom 135 of the drinking bowl 130. The drinking bowl access holes 160 can be opened and closed by the operator as needed. In one embodiment, the drinking bowl access holes 160 and the filling access hole 150 can be closed using plugs. The drinking bowl access holes 160 can have both an air tight and water tight seal. Livestock can access the water in the drinking bowl 130. In one embodiment, a drain 140 can be located at the bottom 135 of the drinking bowl 130. The drain 140 can allow water in the drinking bowl 130 to be drained without disturbing the water in the storage tank 110. After the water has been drained from the drinking bowl 130, it may be cleaned without having to remove the water in the storage tank 110.

The water level in drinking bowl 130 and in the storage tank 110 can be controlled by air flow and gravity. As the storage tank 110 is being filled with water, the air and water tight access holes 160 to the drinking bowl 130 can be closed. After filling the storage tank 110, the filling access hole 150 can then be closed. Thereby, shutting off the airflow into the storage tank 110. Once the storage tank 110 is filled and the filling access hole 150 is closed, the access holes 160 to the drinking bowl 130 can be opened. Gravity and air pressure within the storage tank 110 can result in water emptying into the drinking bowl 130 through the drinking bowl access holes 160. The height of the drinking bowl access hole 160 can allow for an adequate amount of liquid to be in the drinking bowl 130 at all times. Therefore, at any given time, the air flow can be shut off at either drinking bowl access holes 160 or at the filling access hole 150. If the filling access hole 150 remains open while the drinking bowl access holes 160 are open, water can overflow the drinking bowl 130. As the water is being consumed by the livestock, the drinking bowl access holes 160 can be exposed to air, resulting in more water entering the drinking bowl 130 through the drinking bowl access holes 160. In other words, as soon as the animal begins to drink, the drinking bowl 130 can begin to replenish the liquid in the drinking bowl 130. Thereby, a constant level of water can be maintained in the drinking bowl 130 at all times. Since a typical horse can drink approximately a half gallon in a couple sips, the quick replenishment of the drinking bowl 130 can be beneficial. The volume of the water filling the drinking bowl 130 can be controlled by air pressure within the storage tank 110. Although the storage tank 110 has been described as holding water, it may also hold any suitable liquid and/or fluid as needed.

In another embodiment, a heating element may be incorporated within the storage tank 110 to prevent the liquid in the waterer 100 from freezing. The heating element can be positioned in a space at the bottom 115 of the storage tank 110. In one embodiment, the space can be approximately four inches by four inches square. Positioning the heating element at the bottom 115 of the storage tank 110 can allow the electrical cord associated with the heating element to be taken out the bottom 115 or the back 195 of the storage tank 110. This placement can reduce the bend of the electrical cord and can allow more flexibility of the electrical cord. In one embodiment, the electrical cord can be fed through the top 105 of the storage tank 110 down to the bottom 115 of the storage tank 110 and through a heating element access hole drilled in the heating element space. In another embodiment, the threads can be pushed through a electrical cord access hole 190 in the back 195 of the storage tank 110. The electrical cord can have a flanged plastic threaded attachment that wraps around the electrical cord along with a typical rubber "o" ring. The flanged part of the plastic head and the rubber seal can be flush against the back 195 of storage tank 110. A plastic nut can then be attached to the threads on the outside of the storage tank 110 which can be tightened and therefore, preventing liquid from leaking out of the storage tank 110. Placement of the heating element in the storage tank 110 can keep the liquid in the storage tank 110 from freezing. Additionally, the liquid in the drinking bowl 130 may not freeze because of heat transfer through the material of the storage tank 110 as well as the liquid in the drinking bowl 130 being replenished by heated liquid in the storage tank 110 as it is being consumed.

In one embodiment, the waterer 100 can be suspended from a solid support such as, for example, a fence, a wall of a stall, a side of a building or any other suitable solid support. In another embodiment, the waterer 100 is free-standing. The waterer 100 is easy to use and clean and has no moving parts. Due to the capacity of the waterer 100, it may only need to be filled once a day making it more time efficient for small scale farmers and ranchers. The waterer 100 does not require a dedicated water line or electrical line making it more cost-effective for the small farmer/rancher.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise a livestock waterer according to the present invention.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A device designed to provide a continuous supply of liquid to an animal, the device comprising:
    a storage tank for storing liquid, the storage tank comprising a filling access hole located proximately to the top of the storage tank and two drinking bowl access holes, wherein one of the two drinking bowl access holes is located proximately to a lower portion of the storage tank, the other of the two drinking bowl access holes is higher along the storage tank than the one of the two drinking bowl access holes and the two drinking bowl access holes are closed when the filling access hole is open and the filling access hole is closed when the two drinking bowl access holes are open; and a drinking bowl located proximate to the lower portion of the storage tank, wherein the drinking bowl is provided access to the liquid contents of the storage tank via the two drinking bowl access holes when the two drinking bowl access holes are open and wherein the device maintains a constant level of liquid within the drinking bowl solely via gravity and air pressure within the storage tank, without a need for moving parts.

2. The device of claim 1, further comprising:
a heating element positioned in the storage tank to prevent the liquid from freezing within the device.

3. The device of claim 1, wherein the liquid is manually inputted into the storage tank through the filling access hole.

4. The device of claim 1, wherein the storage tank has a storage capacity of about eighteen gallons.

5. The device of claim 1, wherein the storage tank has fill lines demarcated on its side indicating the level of liquid in the storage tank.

6. The device of claim 1, wherein the filling access hole and the two drinking bowl access holes have air tight seals.

7. The device of claim 1, wherein the drinking bowl further comprises:
drain located at the bottom of the drinking bowl to drain the liquid from the drinking bowl.

8. The device of claim 1, wherein the device is suspended from a solid support.

9. The device of claim 1, wherein the device is free standing.

10. The device of claim 1, wherein the device is one molded piece.

11. The device of claim 1, wherein the device comprises a storage tank and a separate drinking bowl.

12. The device of claim 1, wherein the filling access hole is formed on a surface that is recessed from the top of the storage tank.

13. A device designed to provide a continuous level of liquid to an animal, the device comprising:
a storage tank for storing liquid, the storage tank comprising a filling access hole located proximately to the top of the storage tank and two drinking bowl access holes, wherein one of the two drinking bowl access holes is located proximately to a lower portion of the storage tank, another of the two drinking bowl access holes is located closer to the top of the storage tank than the one of the two drinking bowl access holes and the two drinking bowl access holes are closed when the filling access hole is open and the filling access hole is closed when the two drinking bowl access holes are open; and
a drinking bowl located proximate to the lower portion of the storage tank, wherein the drinking bowl is provided access to the liquid contents of the storage tank via the two drinking bowl access holes when the two drinking bowl access holes are open and wherein the device maintains a constant level of liquid within the drinking bowl solely via gravity and air pressure within the storage tank, without a need for moving parts; and
a heating element positioned within the storage tank to prevent the liquid from freezing within the device.

14. The device of claim 13, wherein the heating element is positioned inside the storage tank.

15. The device of claim 13, wherein the heating element is positioned at the bottom of the storage tank.

16. A method of providing a continuous level of liquid to an animal using a waterer, the waterer comprising a storage tank for storing the liquid, a filling access hole located proximately to the top of the storage tank, a first drinking bowl access hole located proximately to a lower portion of the storage tank, a second drinking bowl access hole located closer to the top of the storage tank than the first drinking bowl access hole and a drinking bowl located proximate to a lower portion of the storage tank and having access to the storage tank via the first drinking bowl access hole and the second drinking bowl access hole and the drinking bowl having a bottom drain, wherein the method comprises:
closing the first drinking bowl access hole and the second drinking bowl access hole;
manually filling the storage tank with liquid through the filling access hole;
closing the filling access hole;
opening the first drinking bowl access hole and the second drinking bowl access hole;
filling the drinking bowl with liquid and maintaining the level of liquid in the drinking bowl via the first drinking bowl access hole and the second drinking bowl access hole solely via gravity and air pressure within the storage tank, without a need for moving parts.

17. The method of claim 16, wherein the storage tank is manually filled with a water hose, a bucket, or combinations thereof.

18. The method of claim 16, further comprising:
monitoring the amount of liquid being consumed by the animal by inspecting the liquid level in the storage tank.

19. The method of claim 16, further comprising:
draining the liquid from the drinking bowl by opening the bottom drain.

20. The method of claim 19, further comprising:
cleaning the drinking bowl after draining the liquid from the drinking bowl.

21. The method of claim 16, further comprising:
heating the liquid in the storage tank using a heating element positioned within the storage tank.

22. The method of claim 16, further comprising:
suspending the waterer from a solid support.

* * * * *